US012647481B2

(12) United States Patent
Adivi et al.

(10) Patent No.: US 12,647,481 B2
(45) Date of Patent: Jun. 2, 2026

(54) SYSTEM AND METHOD FOR INFORMATION RETRIEVAL USING DYNAMIC SHARDING

(71) Applicant: Bank of America Corporation, Charlotte, NC (US)

(72) Inventors: Suryanarayana Adivi, Hyderabad (IN); Pushkar Taneja, Hyderabad (IN); Shailendra Singh, Thane West (IN); Venkata Ryali, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/629,748

(22) Filed: Apr. 8, 2024

(65) Prior Publication Data

US 2025/0317490 A1 Oct. 9, 2025

(51) Int. Cl.
H04L 67/1097 (2022.01)
(52) U.S. Cl.
CPC ................................ H04L 67/1097 (2013.01)
(58) Field of Classification Search
CPC .................................................. H04N 67/1097
See application file for complete search history.

(56) References Cited

U.S. PATENT DOCUMENTS

| | | | |
|---|---|---|---|
| 9,411,862 B1 | 8/2016 | Wang et al. | |
| 9,667,720 B1 | 5/2017 | Bent et al. | |
| 10,410,169 B2 | 9/2019 | Vasantham et al. | |
| 10,740,355 B2 | 8/2020 | Horowitz et al. | |
| 10,846,305 B2 | 11/2020 | Merriman et al. | |
| 10,880,266 B1 | 12/2020 | Shribman et al. | |
| 10,983,970 B2 | 4/2021 | Hu et al. | |
| 11,030,169 B1 | 6/2021 | Wu et al. | |
| 11,093,146 B2 | 8/2021 | Karr et al. | |
| 11,182,429 B2 | 11/2021 | Liu et al. | |
| 11,314,701 B2 | 4/2022 | Sun et al. | |
| 11,354,058 B2 | 6/2022 | Bernat et al. | |
| 11,483,175 B2 | 10/2022 | Subramaniyam et al. | |
| 2014/0122510 A1 | 5/2014 | Namkoong et al. | |
| 2016/0011901 A1 | 1/2016 | Hurwitz et al. | |
| 2016/0142475 A1 | 5/2016 | Kathuria et al. | |
| 2017/0103094 A1 | 4/2017 | Hu et al. | |
| 2017/0118281 A1 | 4/2017 | Lehmann | |
| 2017/0353536 A1 | 12/2017 | Shraer et al. | |

*Primary Examiner* — Joshua D Taylor

(57) ABSTRACT

A distributed data storage includes data stored in different data shards on nodes of the distributed data storage. A memory stores a dynamic heatmap indicative of a number of data requests for data stored on each of the nodes. A processor receives a request for retrieving the data stored in the distributed data storage. The request includes data ranges and index criteria of the data and location of the nodes in the distributed data storage. In response, the processor determines the nodes of the distributed data storage that include the data using the dynamic heatmap, retrieves the data as determined from the dynamic heatmap; and routes the data to a user associated with the request. When a data retrieval performance is below a desired threshold value, the processor performs dynamic data sharding to reallocate the data shards across the nodes of the distributed data storage.

20 Claims, 4 Drawing Sheets

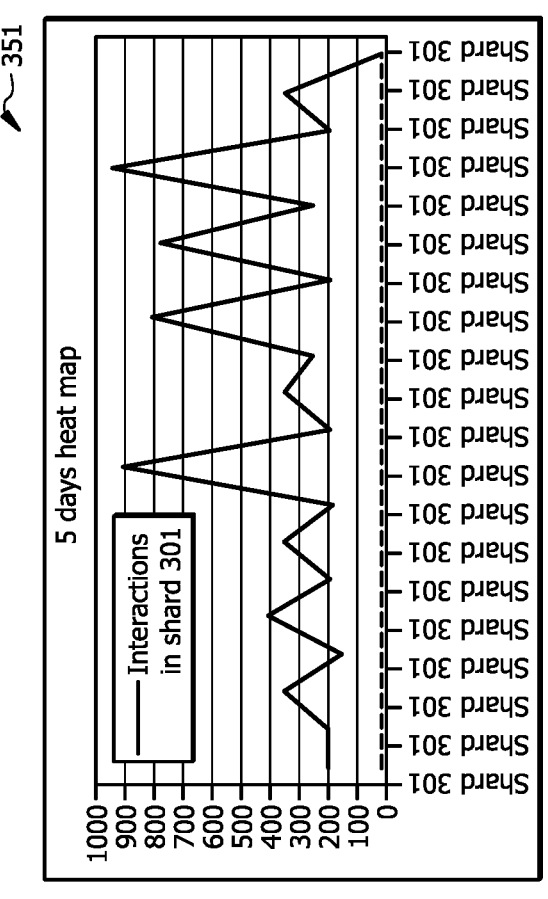

322

| Week | Shard | Interactions in shard 301 | State |
|------|-------|---------------------------|-------|
| Day 1 | Shard 301 | 200 | New York |
| Day 1 | Shard 301 | 200 | Montana |
| Day 1 | Shard 301 | 350 | Texas |
| Day 1 | Shard 301 | 150 | New Jersey |
| Day 2 | Shard 301 | 400 | New York |
| Day 2 | Shard 301 | 200 | Montana |
| Day 2 | Shard 301 | 350 | Texas |
| Day 2 | Shard 301 | 180 | New Jersey |
| Day 3 | Shard 301 | 900 | New York |
| Day 3 | Shard 301 | 200 | Montana |
| Day 3 | Shard 301 | 350 | Texas |
| Day 3 | Shard 301 | 250 | New Jersey |
| Day 4 | Shard 301 | 800 | New York |
| Day 4 | Shard 301 | 200 | Montana |
| Day 4 | Shard 301 | 780 | Texas |
| Day 4 | Shard 301 | 250 | New Jersey |
| Day 5 | Shard 301 | 950 | New York |
| Day 5 | Shard 301 | 200 | Montana |
| Day 5 | Shard 301 | 350 | Texas |
| Day 5 | Shard 301 | 20 | New Jersey |

351

5 days heat map

Interactions in shard 301

1000 900 800 700 600 500 400 300 200 100 0

Shard 301

*FIG. 3B*

| State | Sum of Interactions |
|-------|---------------------|
| Montana | 1000 |
| New Jersey | 850 |
| New York | 3250 |
| Texas | 2180 |

362 New York

364 Texas

366 Montana New Jersey

SYSTEM AND METHOD FOR INFORMATION RETRIEVAL USING DYNAMIC SHARDING

TECHNICAL FIELD

The present disclosure relates generally to network communication, and more specifically to a system and method for information retrieval using dynamic sharding.

BACKGROUND

A distributed data storage spans multiple nodes (e.g., servers or computers) across geographically dispersed data centers. Data requests from such a distributed data storage often include varied data ranges. Each data range is distributed across different nodes to optimize performance and improve fault tolerance. The distributed data storage is designed with prior knowledge of the expected data usage scenarios. Once a data model is created, it is challenging to optimize it for write and/or read operations. Since the data model is determined at design time, any subsequent changes to accommodate new performance requirements or adaptations to evolving needs result in significant challenges.

SUMMARY

Embodiments of the disclosure are directed to information retrieval using dynamic data sharding in a distributed data storage, including data stored as shards on different nodes (e.g., servers) of the distributed data storage. A request for data is initially received by a request mediator that analyzes the request to determine the requested data range and index criteria. The request mediator utilizes a dynamic heatmap to track the status and performance of the clusters, nodes, ranges, and indexes in the distributed data storage. This dynamic heatmap is updated at predefined intervals to reflect the changing conditions of the distributed data storage. The dynamic heatmap is a visual representation of data that shows the intensity or density of a specific variable on a map or grid. It allows for the visualization of patterns and trends in the data that is stored and accessed in the distributed data storage. The request mediator provides the data requests to a data aggregation model that combines similar data requests into a single dataset.

The system also utilizes filters that are configured to determine a state of the network including the distributed data storage by analyzing the network components, the available resources of the distributed data storage, the available data paths in the network, etc. The filters may provide the state of the network to a context-aware multiplexer, which uses the network information from the filters to route the datasets received from the data aggregation model to the appropriate nodes for data fetching. The context-aware multiplexer analyzes the contextual information associated with the data requests (in the received datasets) to determine how and where to route the data requests. The contextual information includes one or more of a type of the data requests, priority of the data, user preferences, network conditions, and current workload of the network, for instance.

In addition to providing the requested data to the user, the system may perform dynamic data sharding when the data retrieval time (or any desired performance metric pertaining to the data retrieval from the nodes) goes above a threshold level. In data sharding, the data shards associated with a node are reallocated to one or more other nodes of the distributed data storage. For instance, these other nodes may be geographically closer to the user, may be less utilized than the other nodes, or data retrieval times from these nodes may be shorter than the time from other nodes of the distributed data storage. The data corresponding to the different data requests is fetched from the various nodes, ranges, and indexes and is routed to the request mediator, where the data is aggregated and provided to the user making the request.

Certain embodiments of this disclosure provide unique solutions to technical problems encountered in improving read and/or write operations in a distributed data storage by efficiently routing the data from the data requests and by performing data sharding when the data retrieval does not meet expected performance level. As disclosed, embodiments utilize a dynamic heatmap to track the status and performance of the clusters, nodes, ranges, and indexes in the distributed data storage. The data shards that are more frequently accessed to retrieve information are reallocated to other nodes of the distributed data storage from where data retrieval meets or exceeds the performance level.

In certain embodiments, this disclosure may particularly be integrated into a practical application of a computer system including the distributed data storage, which uses a specially structured algorithm to determine whether data requests to fetch data from the distributed data storage are fulfilled within a desired time period, and when the data fetch times (or other metrics) for retrieving data from the nodes exceed a threshold, the data shards are reallocated to other nodes of the distributed data storage in order to reduce the data fetch times. Additionally, the system evaluates the condition or the context of the data that is fetched and makes intelligent decision on how to route the data. Therefore, by reallocating the data shards to different nodes and by intelligently routing the fetched data, the data retrieval process utilizes a better route to retrieve and deliver the data, improves system efficiency, and improves system performance.

In one embodiment, a system includes a distributed data storage including data stored in different data shards on nodes of the distributed data storage, a memory configured to store a dynamic heatmap indicative of a number of data requests for data stored on each of the different nodes, frequency of the data requests, processing time of the data requests and response times of the nodes for the data requests, and a processor communicatively coupled to the memory. The processor is configured to receive a request for retrieving the data stored in the distributed data storage. The request includes data ranges and index criteria of the data and location of the nodes in the distributed data storage. The processor is further configured to determine the different nodes of the distributed data storage that include the data indicated by the data ranges, index criteria and locations of the nodes included in the request using the dynamic heatmap, retrieve the data from the different nodes as determined from the dynamic heatmap using roaming filters, and route the data to a user associated with the request, through a network including the distributed data storage. The processor is further configured to, in response to determining that a data retrieval performance of retrieving data from the different nodes is below a desired threshold, perform data sharding to reallocate the different data shards across the different nodes of the distributed data storage.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A, 3B, 3C, and 3D illustrate a dynamic heatmap and dynamic data sharding performed using the dynamic heatmap, in accordance with one or more embodiments of the present disclosure.

DETAILED DESCRIPTION

Figure 1:
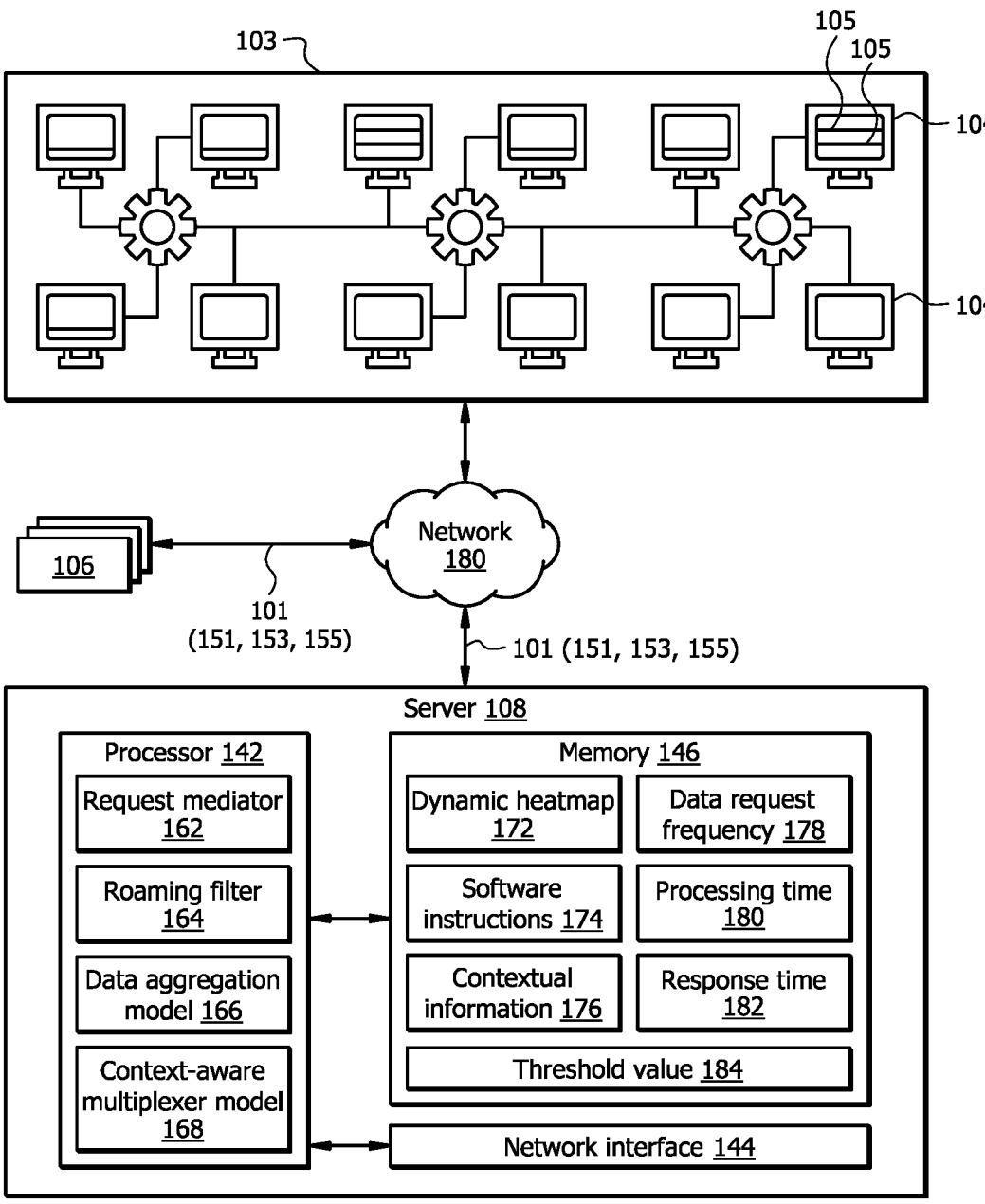
FIG. 1 is a schematic diagram of a system, in accordance with one or more embodiments of the present disclosure.

FIG. 1 is a schematic diagram of a system 100 that includes a distributed data storage 103 (e.g., a distributed database), communicatively coupled with a server 108 via a network 180. The distributed data storage 103 may be accessed by one or more user devices 106 via the network 180 to access the data stored therein. The data in the distributed data storage 103 is stored as data shards 105 (of a larger dataset) distributed across different nodes 109 of the distributed data storage 103. The network 180 enables the communication between the distributed data storage 103, the user devices 106 and the server 108.

Network

The network 180 may be any suitable type of wireless and/or wired network. The network 180 may be connected to the Internet or public network. The network 180 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 180 may be configured to support any suitable type of communication protocol as would be appreciated by one of ordinary skill in the art.

User Device

Each user device 106 is associated with a corresponding user and may access the desired information via a request 101 sent to the distributed data storage 103. As discussed further below, this request 101 is received by the server 108 that analyzes the request 101 to fetch the user desired information from the distributed data storage 103. The user device 106 may be connected to the network 180 and is configured to access the distributed data storage 103 to receive the requested data. Examples of the user devices 106 include but are not limited to, any electronic device such as a personal computer, a desktop computer, a laptop, a tablet computer, a mobile phone (such as a smartphone), or any other suitable type of device. The user device 106 may include a user interface, such as a display, a microphone, a camera, a keypad, or other appropriate terminal equipment usable by a user. The user device 106 may include a hardware processor, memory, and/or circuitry configured to perform any of the functions or actions of the user device.

Each user device 106 may be configured to transmit a data request as requested by a corresponding user to access the data stored in the distributed data storage 103 and to receive the data received from the distributed data storage 103 in response to the data request.

Server

Server 108 may include one or more hardware computer systems, such as virtual machines. For example, the server 108 may be implemented by a plurality of computing devices using distributed computing and/or cloud computing systems in a network. In some embodiments, the server 108 may be a server in a server farm. The server 108 may be an instance of one or more servers 108. In certain embodiments, the server 108 may be configured to provide services and resources (e.g., data and/or hardware resources) to the components of the system 100.

The server 108 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the server 108 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to perform one or more operations of the example method 200 described in FIG. 2, and other tasks described herein.

The processor 142 may be programmed with a request mediator 162 (also referred to as a facilitator model), a roaming filter 164, a data aggregation model 166, and a context-aware multiplexer model 168. The request mediator 162 is configured to analyze an incoming request 101 from the user device 106 to determine the requested data range and index criteria. For example, the request mediator 162 is configured for intercepting and optimizing operations such as Create, Read, Update, and Delete (CRUD). The request mediator 162 may analyze the request 101 to obtain the data ranges 151 and the index criteria 153, and location 155 of the nodes 109 included in the request 101, and is configured to generate multiple threads to fetch data for each of the determined data range and index criteria. In some embodiments, each data request from one or more user devices 106 is assigned a dedicated request mediator 162.

The request mediator 162 provides the multiple data requests from one or more user devices 106 to the data aggregation model 166 that consolidates similar data requests into a single dataset. For example, considering a banking use case, all requests for loan applications may be combined into a single dataset including all loan application, or all requests for credit card applications may be combined into a single dataset including all credit card applications. As a result, operational efficiency is increased since individual data requests for individual loan applications or individual credit card applications may not be required for fetching the required data from the distributed data storage 103.

The roaming filter 164 may be configured to determine a state of the network comprising the distributed data storage 103 by analyzing the different network components, the available resources of the distributed data storage 103, the available data paths in the network, available secure paths (routes) for sensitive data, etc. The roaming filter 164 may provide the state of the network to the context-aware multiplexer model 168. The context-aware multiplexer model 168 uses the information from the roaming filters 164 to route the datasets received from the data aggregation model 166 to the appropriate nodes 109 of the distributed data storage 103 and for routing the fetched data based on request 101 to the user device 106. As a result, the data is delivered faster, more efficiently, and system performance is improved.

The network interface 144 is configured to enable wired and/or wireless communications. The network interface 144 may be configured to communicate data between the server 108 and other devices, systems, or domains of the system 100. For example, the network interface 144 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1 and 2 along with any other data, instructions, logic, rules, or code operable to implement the function(s) described herein when executed by processor 142. For example, the memory 146 is operable to store the dynamic heatmap 172, software instructions 174, contextual information 176, and/or any other data or instructions. The software instructions 174 may comprise any suitable set of instructions, logic, rules, or code operable to execute the processor 142 and perform the functions described herein, such as some or all of those described in FIGS. 1, 2, and 3A-3D.

In some embodiments, a dynamic heatmap 172 is utilized (or otherwise referenced by) the request mediator 162 to track the status and performance of the clusters, nodes, ranges, and indexes in the distributed data storage 103. This dynamic heatmap 172 is updated at user defined intervals to reflect the changing conditions of the distributed data storage 103. In some embodiments, the dynamic heatmap 172 is a visual representation of data that is stored in the different clusters, nodes, ranges, and indexes in the distributed data storage 103 and shows the intensity or density of a desired variable (e.g., a number of data requests for data stored on each node 109 of a distributed data storage 103, frequency 178 of the requests 101, processing time 180 of the requests 101, response times 182 of the nodes 190 for the requests 101, or similar) on a map or grid. This may allow for the visualization of patterns and trends in the data that is stored and accessed in the distributed data storage 103.

The contextual information 176 is associated with the data requests (or in the datasets received from the data aggregation model 166) and is used to determine how and where to route the data requests. The contextual information includes one or more of a type of the data requests, priority of the data, user preferences, network conditions, and current workload of the network, for instance.

When a user device 106 provides a request 101 via the network 180 to access information from the distributed data storage 103, the request 101 is obtained by the server 108. At the server 108, the processor 142 is configured to receive the request 101 at the request mediator 162. The request mediator 162 is configured to analyze the request 101 from the user device 106 to determine the requested data range and index criteria of the data requested by the user device 106. The request mediator references a dynamic heatmap 172 that tracks the status and performance of the various clusters, nodes, ranges, and indexes in the distributed data storage 103. The dynamic heatmap 172 is updated at user defined intervals (e.g., every hour, two hours, daily, weekly, etc.) to reflect the changing conditions of the distributed data storage 103. In an embodiment, each request 101 from a user device 106 is assigned a dedicated request mediator 162. The request mediator 162 provides the request 101 to the data aggregation model 166 that combines similar requests 101 into a single dataset. The data aggregation model 166 may streamline the process of organizing and analyzing data and thereby simplifying it for easier comprehension.

The roaming filter 164 may be configured to determine a state of the network comprising the distributed data storage 103 by analyzing network data related to the different network components, the available resources of the distributed data storage 103, the available data paths in the network, available secure paths (routes) for sensitive data, etc. The roaming filter 164 may run parallel processes for fetching the network data from multiple sources simultaneously.

Using the information from the roaming filters 164 and dynamic heatmap 172, the processor 142 may be configured to perform dynamic data sharding. For instance, using the dynamic heatmap 172 and the roaming filters 164, the processor may be able to identify locations (e.g., nodes 109) of the distributed data storage 103 where data is more frequently accessed that other areas of the distributed data storage 103. Such frequent access of data from a single location or from a select few locations may cause sections of the distributed data storage 103 to be more utilized than other sections, causing congestion and slowing down data flow. In an embodiment, the processor may determine that a data retrieval performance of retrieving data from one or more nodes 109 of the distributed data storage 103 is below a desired threshold value 184. For instance, the processor may determine the nodes 109 in a geographical location are accessed more frequently and this has caused data retrieval times from these nodes 109 to exceed 2 ms (or any predetermined threshold value). When this is determined, dynamic data sharding may be performed for those nodes 109. Dynamic data sharding may refer to the ability to adjust the shard allocation based on changing workload patterns or conditions. It allows for the automatic and flexible redistribution of data to less "crowded" sections of the distributed data storage 103 to balance the load, enhance performance, and accommodate varying data access patterns. It should be noted that data retrieval time is merely an example of different kinds of metrics that be used to monitor performance of the distributed data storage 103 and embodiments are not limited thereto. In some embodiments, data sharding may be performed by reallocating data shards of the data that are more frequently accessed than other data shards of the data to nodes 109 of the distributed data storage 103 that are geographically closer to the user device 106, or to nodes 109 of the distributed data storage 103 that are less frequently accessed than other nodes 109 of the distributed data storage 103, or to nodes 109 of the distributed data storage 103 that are accessible by the user device 106 in relatively lesser time than other nodes 109 of the distributed data storage 103.

The context-aware multiplexer model 168 may be configured to determine a route to retrieve data efficiently and in relatively lesser time from the nodes 109 109. The context-aware multiplexer model 168 may consider factors like network congestion and available resources to make decisions about how to handle and route the data fetched based on the request 101. The context-aware multiplexer model 168 is configured to adaptively select and route data based on the contextual information related to the data. In other words, the context-aware multiplexer model 168 may evaluate the condition or the context of the data being transmitted and makes intelligent decisions on how to handle and route that data. Once the data has been fetched from the various clusters, nodes, ranges, and indexes, the request mediator 162 is configured to aggregate the data and provide (output) it to the user device 106. The aggregation reduces the need for the user device 106 to query multiple sources independently, making data retrieval fast and straightforward.

Figure 2:
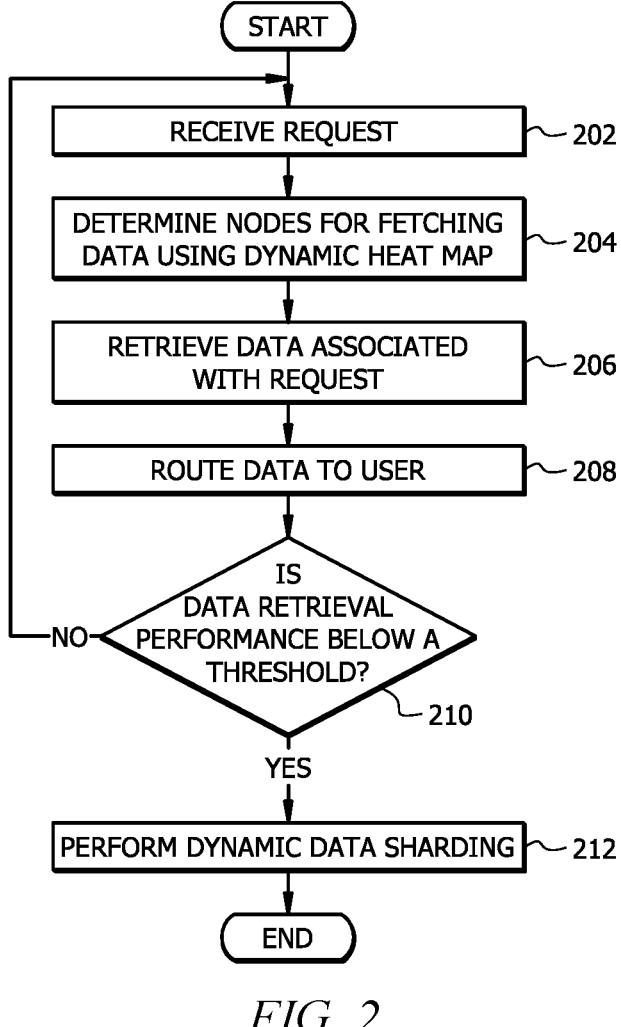
FIG. 2 illustrates a flowchart of an example method for information retrieval using dynamic data sharding, in accordance with one or more embodiments of the present disclosure.

FIG. 2 illustrates a flowchart of an example method 200 for information retrieval using dynamic data sharding, in accordance with one or more embodiments of the present disclosure. In some embodiments, the processor 142 is configured to perform one or more operations of the example method 200, and other tasks described herein.

At operation 202, the processor 142 receives a request 101 from a user device 106 for data contained in the distributed data storage 103. The data in the distributed data storage 103 is stored as data shards 105 (of a larger dataset) distributed across different nodes 109 of the distributed data storage 103.

At operation 204, the processor 142, using the request mediator 162, is configured to analyze the request 101 to determine the requested data range and index criteria of the data requested by the user device 106. In determining the requested data range and index criteria, the processor 142 refers to a dynamic heatmap 172 that tracks the status and performance of the various clusters, nodes, ranges, and indexes in the distributed data storage 103. In some embodiments, the processor 142 may receive multiple data requests from one or more user devices 106 and the processor 142 consolidates similar data requests into a single dataset, thereby generating multiple datasets.

At operation 206, the processor 142 retrieves the data associated with the request 101. The processor 142 determines a state of the network comprising the distributed data storage 103 by analyzing the different network components, the available resources of the distributed data storage 103, the available data paths in the network, available secure paths (routes) for sensitive data, etc. The processor 142 uses the information regarding the state of the network to route the datasets received to the appropriate nodes 109 of the distributed data storage 103.

At operation 208, the fetched data associated with the request 101 is routed to the user device 106 using the information regarding the state of the network. As a result, the data is fetched and delivered faster, more efficiently, and the overall system performance is improved.

At operation 210, the processor 142 evaluates whether a data retrieval performance of retrieving data from the different nodes 109 is below a desired threshold 184. If it is determined that the data retrieval performance is below the desired threshold 184, then in operation 212, the processor performs dynamic data sharding to reallocate the different data shards across the different nodes 109 of the distributed data storage 103. If it is determined that the data retrieval performance is at or above the desired threshold 184, then the method proceeds to operation 202.

Figure 3A:
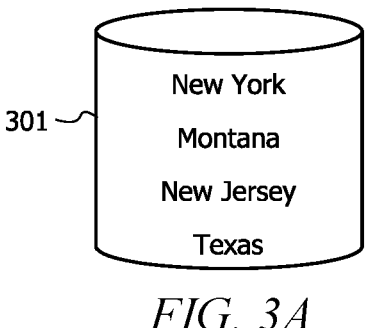
Figures 3C, 3D:
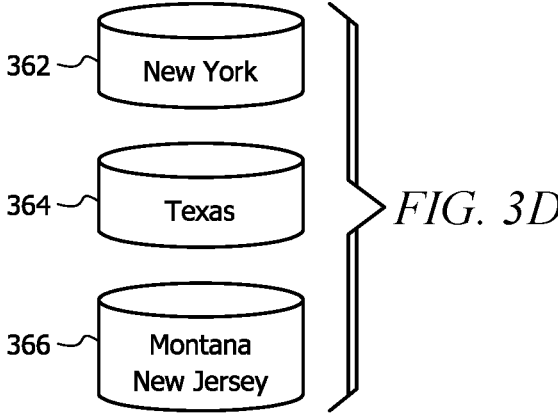

FIGS. 3A-3D illustrate a dynamic heatmap and dynamic data sharding performed using the dynamic heatmap, in accordance with one or more embodiments of the present disclosure. As illustrated in FIG. 3A, a data shard 301 of an example distributed data storage (e.g., a data shard 105 of a node 109 of the distributed data storage 103 in FIG. 1) includes data that is accessed by users residing in states, New York, Montana, New Jersey, and Texas. In FIG. 3B, table 322 lists the interactions occurring in the data shard 301 for a 5-day period and a dynamic heatmap 351 depicts the interactions from table 322. In FIG. 3C, table 324 lists the sum of the interactions for each state during the 5-day period. During the process of accessing data from the distributed data storage (e.g., using the method 200 in FIG. 2), it may be determined that the data retrieval performance of retrieving data from the node including the data shard 301 is below a desired threshold 184. Referring to the dynamic heatmap 351, the system will dynamically recreate multiple shards to accommodate the relatively high volume of interactions from New York and Texas states, and the relatively low volume of interactions from Montana and New Jersey. FIG. 3D illustrates the recreated shards as a data shard 362 for New York, a data shard 364 for Texas, and a data shard 366 for Montana and New Jersey. As illustrated, New York and Texas are resharded as individual data shards to account for the relatively high volume of interactions for these states, while Montana and New Jersey are resharded together in a single shard 366 considering the relatively low volume of interactions for these states. This redesign of data sharding aims to optimize the system's performance and ensure efficient handling of the increased workload.

While several embodiments have been provided in the present disclosure, the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   a distributed data storage including data stored in different data shards on nodes of the distributed data storage;
   a memory configured to store a dynamic heatmap indicative of a number of data requests for the data stored on each of the nodes, frequency of the data requests, processing time of the data requests and response times of the nodes for the data requests; and
   a processor communicatively coupled to the memory, the processor configured to:
      receive a request for retrieving at least a portion of the data stored in the distributed data storage, wherein the request includes data ranges and index criteria of the data and location of the nodes in the distributed data storage;
      determine the nodes of the distributed data storage that include the data indicated by the data ranges, index criteria and locations included in the request using the dynamic heatmap;
      retrieve, based on a state of a network including the distributed data storage as determined using roaming filters and based on the dynamic heatmap, the requested data from the nodes of the distributed data storage; and
      route the retrieved data to a user associated with the request, through the network including the distributed data storage, wherein, in response to determining that a data retrieval performance of retrieving data from the nodes is below a desired threshold, the processor is further configured to perform dynamic data sharding to reallocate the different data shards across the nodes of the distributed data storage.

2. The system of claim 1, wherein the processor is further configured to collect a plurality of requests from different sources and consolidate similar requests from the plurality of requests into a single dataset.

3. The system of claim 1, wherein the processor is further configured to perform data sharding by reallocating data shards of the data that are more frequently accessed than other data shards of the data (1) to nodes of the distributed data storage that are geographically closer to the user, (2) to nodes of the distributed data storage that are less frequently accessed than other nodes of the distributed data storage, or (3) to nodes of the distributed data storage that are accessible by the user in a lesser time than other nodes of the distributed data storage.

4. The system of claim 1, wherein the roaming filters are configured to run multiple parallel processes to retrieve network data simultaneously to determine a state of the network.

5. The system of claim 1, wherein the processor is further configured to analyze the request using a request mediator to obtain the data ranges and the index criteria from the request, wherein the processor is further configured to generate multiple threads, using the request mediator, to fetch data for each of the determined data range and index criteria.

6. The system of claim 5, wherein the processor is further configured to receive a plurality of data requests and assign a dedicated request mediator to each data request of the plurality of data requests.

7. The system of claim 1, wherein the processor is further configured to route the data using contextual information associated with the data, wherein the contextual information comprises one or more of a type of the data, priority of the data, user preferences, network conditions, and current workload of the network.

8. A method, comprising:
   storing, in a memory, a dynamic heatmap indicative of a number of data requests for data stored on each node of a distributed data storage, frequency of the data requests, processing time of the data requests and response times of the nodes for the data requests, wherein the data is stored in different data shards on the nodes of the distributed data storage;
   receiving a request for retrieving at least a portion of the data stored in the distributed data storage, wherein the request includes data ranges and index criteria of the data and location of the nodes in the distributed data storage;
   determining the nodes of the distributed data storage that include the data indicated by the data ranges, index criteria and locations included in the request using the dynamic heatmap;
   retrieving, based on a state of a network including the distributed data storage as determined using roaming filters and based on the dynamic heatmap, the requested data from the nodes of the distributed data storage;
   routing the retrieved data to a user associated with the request, through a network including the distributed data storage; and
   in response to determining that a data retrieval performance of retrieving data from the nodes is below a desired threshold, performing data sharding to reallocate the different data shards across the nodes of the distributed data storage.

9. The method of claim 8, further comprising collecting a plurality of requests from different sources and consolidating similar requests from the plurality of requests into a single dataset.

10. The method of claim 8, further comprising performing data sharding by reallocating data shards of the data that are more frequently accessed than other data shards of the data (1) to nodes of the distributed data storage that are geographically closer to the user, (2) to nodes of the distributed data storage that are less frequently accessed than other node of the distributed data storage, or (3) to nodes of the distributed data storage that are accessible by the user in a lesser time than other nodes of the distributed data storage.

11. The method of claim 8, wherein the roaming filters are configured to run multiple parallel processes to retrieve network data simultaneously to determine a state of the network.

12. The method of claim 8, further comprising:

analyzing the request using a request mediator to obtain the data ranges and the index criteria from the request; and generating multiple threads, using the request mediator, to fetch data for each of the determined data range and index criteria.

13. The method of claim 12, further comprising:

receiving a plurality of data requests; and assigning a dedicated request mediator to each data request of the plurality of data requests.

14. The method of claim 8, further comprising routing the data using contextual information associated with the data, wherein the contextual information comprises one or more of a type of the data, priority of the data, user preferences, network conditions, and current workload of the network.

15. A non-transitory computer-readable medium storing instructions that when executed by a processor cause the processor to:

store, in a memory, a dynamic heatmap indicative of a number of data requests for data stored on each node of a distributed data storage, frequency of the data requests, processing time of the data requests and response times of the nodes for the data requests, wherein the data is stored in different data shards on the nodes of the distributed data storage;

receive a request for retrieving at least a portion of the data stored in the distributed data storage, wherein the request includes data ranges and index criteria of the data and location of the nodes in the distributed data storage;

determine the nodes of the distributed data storage that include the data indicated by the data ranges, index criteria and locations included in the request using the dynamic heatmap;

retrieve, using roaming filters, the requested data from the nodes as determined from the dynamic heatmap;

route the retrieved data to a user associated with the request, through a network including the distributed data storage; and in response to determining that a data retrieval performance of retrieving data from the nodes is below a desired threshold, perform data sharding to reallocate the different data shards across the nodes of the distributed data storage.

16. The non-transitory computer-readable medium of claim 15, wherein the instructions further cause the processor to:

perform data sharding by reallocating data shards of the data that are more frequently accessed than other data shards of the data (1) to nodes of the distributed data storage that are geographically closer to the user, (2) to nodes of the distributed data storage that are less frequently accessed than other node of the distributed data storage, or (3) to nodes of the distributed data storage that are accessible by the user in a lesser time than other nodes of the distributed data storage.

17. The non-transitory computer-readable medium of claim 16, wherein the instructions further cause the processor to:

analyze the request using a request mediator to obtain the data ranges and the index criteria from the request, wherein the processor is further configured to generate multiple threads, using the request mediator, to fetch data for each of the determined data range and index criteria.

18. The non-transitory computer-readable medium of claim 17, wherein the instructions further cause the processor to:

receive a plurality of data requests and assign a dedicated request mediator to each data request of the plurality of data requests.

19. The non-transitory computer-readable medium of claim 16, wherein the instructions further cause the processor to route the data using contextual information associated with the data, wherein the contextual information comprises one or more of a type of the data, priority of the data, user preferences, network conditions, and current workload of the network.

20. The non-transitory computer-readable medium of claim 15, wherein the instructions further cause the processor to run multiple parallel processes to retrieve network data simultaneously to determine a state of the network.

* * * * *